(12) United States Patent
Mazouz et al.

(10) Patent No.: US 12,139,775 B2
(45) Date of Patent: Nov. 12, 2024

(54) PROCESS FOR PURIFYING AND CONCENTRATING RARE EARTHS FROM PHOSPHOGYPSUM

(71) Applicant: OCP SA, Casablanca (MA)

(72) Inventors: Hamid Mazouz, Casablanca (MA); Rachid Boulif, El Jadida (MA); Essaid Bilal, Saint-Etienne (FR)

(73) Assignee: OCP SA (MA)

( * ) Notice: Subject to any disclaimer, the term of this patent is extended or adjusted under 35 U.S.C. 154(b) by 804 days.

(21) Appl. No.: 17/279,932

(22) PCT Filed: Sep. 30, 2019

(86) PCT No.: PCT/MA2019/000008
§ 371 (c)(1),
(2) Date: Mar. 25, 2021

(87) PCT Pub. No.: WO2020/067856
PCT Pub. Date: Apr. 2, 2020

(65) Prior Publication Data
US 2021/0388466 A1 Dec. 16, 2021

(30) Foreign Application Priority Data
Sep. 28, 2018 (FR) ...................... 1858946

(51) Int. Cl.
| C22B 59/00 | (2006.01) |
| C01F 17/10 | (2020.01) |
| C22B 3/06 | (2006.01) |
| C22B 3/08 | (2006.01) |
| C22B 3/44 | (2006.01) |

(52) U.S. Cl.
CPC .............. *C22B 59/00* (2013.01); *C01F 17/10* (2020.01); *C22B 3/065* (2013.01); *C22B 3/08* (2013.01); *C22B 3/44* (2013.01)

(58) Field of Classification Search
None
See application file for complete search history.

(56) References Cited

U.S. PATENT DOCUMENTS

| 5,034,201 A | 7/1991 | Cailly et al. |
| 2012/0114538 A1 | 5/2012 | Abramov et al. |
| 2015/0284822 A1 | 10/2015 | Abramov et al. |
| 2016/0032423 A1* | 2/2016 | Genkin .................. C22B 59/00 423/21.1 |
| 2021/0388466 A1* | 12/2021 | Mazouz ................. C22B 3/065 |

FOREIGN PATENT DOCUMENTS

| CN | 104903476 A | 9/2015 |
| EP | 0419318 A1 | 3/1991 |
| RU | 2293781 C1 | 2/2007 |
| WO | 2011008137 A2 | 1/2011 |
| WO | 2013060689 A1 | 5/2013 |
| WO | 2014137239 A1 | 9/2014 |

OTHER PUBLICATIONS

French Search Report including Written Opinion for Application No. FR 1858946, dated May 15, 2019, 6 pages.
International Search Report including Written Opinion for Application No. PCT/MA2019/000008, dated Oct. 28, 2019, 13 pages.
Peelman et al., "Leaching of Rare Earth Elements: Past and Present", Sep. 7, 2014, pp. 446-456.

* cited by examiner

*Primary Examiner* — George Wyszomierski
*Assistant Examiner* — Nikolas Takuya Pullen
(74) *Attorney, Agent, or Firm* — Lerner David LLP

(57) ABSTRACT

The present invention relates to a process for purifying and concentrating rare earths contained in phosphogypsum, characterised in that it comprises the following steps of:
from a phosphogypsum,
a) Leaching the phosphogypsum with a solution of one or more strong acid(s) selected from among: sulphuric acid, nitric acid and hydrochloric acid, in order to obtain a leaching mixture comprising a liquid phase formed by a leaching solution containing rare earths from the phosphogypsum and the leaching acid, and a solid phase comprising the phosphogypsum,
b) Adding, to the phosphogypsum, an oxidising agent to promote passage of the rare earths from the phosphogypsum into the leaching solution, and/or a reducing agent to reduce solubility of mineral impurities contained in the leaching solution in order to allow their passage from the leaching solution into the solid phase,
c) Separating the liquid phase enriched in rare earths and depleted in mineral impurities, and the solid phase enriched in mineral impurities.

15 Claims, No Drawings

PROCESS FOR PURIFYING AND CONCENTRATING RARE EARTHS FROM PHOSPHOGYPSUM

CROSS-REFERENCE TO RELATED APPLICATIONS

The present application is a national phase entry under 35 U.S.C § 371 of International Application No. PCT/MA2019/000008 filed Sep. 30, 2019, which claims priority from French Application No. 1858946 filed Sep. 28, 2018, all of which are hereby incorporated herein by reference.

FIELD OF THE INVENTION

The present invention relates to the field of leaching phosphogypsum obtained by the action of phosphoric acid on a phosphate rock. The invention more particularly relates to the leaching of phosphogypsum as well as the resulting leaching solution and the chemical treatment of the leaching solution.

STATE OF THE ART

The action of a strong acid, such as hydrochloric acid or sulphuric acid for example, on a phosphate rock makes it possible to obtain phosphogypsum, the latter being in chemical nomenclature calcium sulphate dihydrate of the formula $CaSO_4, 2H_2O$.

The chemical reaction corresponding to the treatment of a phosphate rock with sulphuric acid is as follows:

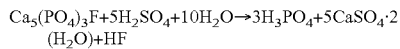

$$Ca_5(PO_4)_3F + 5H_2SO_4 + 10H_2O \rightarrow 3H_3PO_4 + 5CaSO_4 \cdot 2(H_2O) + HF$$

As shown in the above reaction, phosphogypsum is a by-product of the wet phosphoric acid production reaction, this process being the most commonly used process for phosphoric acid production.

Phosphate deposits are known to contain various levels of rare earths, these levels being relatively low, generally less than 1% by weight of rare earths in relation to the weight of the phosphate rock, and often even less than 0.1% by weight as in the case of sedimentary phosphate.

Rare earths are of particular interest because their physico-chemical properties make them the materials of choice in a variety of applications such as optics (lighting, radiography), mechanics (due to their high hardness), and magnetics (manufacture of permanent magnets).

During the production of phosphoric acid by the action of sulphuric acid on phosphogypsum, it is generally estimated that more than 80% by weight of the rare earths initially present in the phosphate rock are found in the phosphogypsum obtained.

Numerous processes have therefore been developed to enable and improve the extraction and purification of rare earths from phosphogypsum. These processes are typically based on a phosphogypsum leaching step consisting in treating the phosphogypsum with a strong leaching acid in order to obtain a leaching mixture, sometimes referred to as a leaching suspension. The leaching mixture comprises a solid phase mainly made of phosphogypsum and a liquid phase containing the rare earths initially present in the phosphogypsum. It is therefore important to improve the leaching process in order to increase the efficiency of extraction of rare earths from the phosphogypsum and thus the yield of rare earths.

Among processes existing in the literature, document CN104903476 describes a process for extracting rare earths from a solid ore or from a by-product of ore processing such as phosphogypsum. This process consists in performing crushing of the initial solid compound to obtain solid elements smaller than 100 μm, and then leaching, by the action of a mixture of sulphuric acid and nitric acid, on the crushed solid elements. The leaching is carried out under conditions in which the sulphuric acid and nitric acid are in respective weight ratios of between 6:1 and 1:1, the liquid/solid mass ratio of the suspension is between 2:1 and 6:1, and the acid mixture is at a concentration of less than 15% by weight. This process gives a rare earth leaching yield of over 76%.

Document WO2011/008137 provides a process for extracting rare earths from phosphogypsum by leaching with a mixture of sulphuric acid and nitric acid with a mass ratio of 3.2:1.2. The liquid to solid mass ratio of the suspension is 4:5, and the acid mixture is at a concentration of between 1% and 3% by weight. This process gives a yield in the order of 81%. However, it is noted that the extraction of rare earths according to the process described is accompanied with a solubilisation of the phosphogypsum, which affects quality of the rare earths obtained.

Document WO2013060689 describes a process for extracting rare earths from calcium sulphate. This process is based on a maturation step of calcium sulphate hemihydrate containing the rare earths with a crystallisation into calcium sulphate dihydrate by capturing residual water or moisture. A sulphuric acid leach of the calcium sulphate dihydrate is then carried out, with a mass ratio between sulphuric acid and calcium sulphate of between 0.15 and 0.35. This process allows a yield of more than 80% to be obtained.

The processes described in the documents set forth above aim at increasing the efficiency of extraction of rare earths from calcium sulphate, and thus the rare earth yield of this extraction.

But it is known that phosphogypsum obtained by the action of phosphoric acid on a phosphate rock has a high content of impurities, and more particularly a high content of mineral impurities due to its mineral origin.

However, none of the documents set forth discuss the presence of impurities in the leaching solution, and the decrease in the rare earth content of the leaching solution resulting therefrom.

DISCLOSURE OF THE INVENTION

The purpose of the invention is therefore to overcome the drawbacks of prior art by providing a process for purifying and concentrating the rare earths initially contained in phosphogypsum, making it possible to reduce the content of mineral impurities and increase the content of rare earths in the leaching solution.

To this end, according to a first aspect, the invention provides a process for purifying and concentrating the rare earths contained in phosphogypsum, characterised in that it comprises the following steps of:

from a phosphogypsum,
a) leaching the phosphogypsum with a solution of one or more strong acid(s) chosen from among: sulphuric acid, nitric acid and hydrochloric acid, in order to obtain a leaching mixture comprising a liquid phase formed by a leaching solution containing rare earths from the phosphogypsum and the leaching acid, and a solid phase comprising the phosphogypsum, b) adding, to the phosphogypsum, an oxidising agent to promote passage of the rare earths from the phosphogypsum into the leaching solution, and/or a reducing agent to reduce solubility of the mineral impurities contained in the leaching solution in order to allow their passage from the leaching solution into the solid phase, c) separating the liquid phase enriched in rare earths and depleted in mineral impurities, and the solid phase enriched in mineral impurities.

According to other aspects, the process provided has the following different characteristics taken alone or according to their technically possible combinations:
the process further comprises a step $a_0$) of washing the phosphogypsum with a sulphate solution carried out prior to the leaching step a);
the sulphate solution implemented in step $a_0$) is a potassium sulphate solution, a sodium sulphate solution, a calcium sulphate solution, or a mixture thereof;
the sulphate content in the sulphate solution is less than or equal to 25%, preferably less than or equal to 20%, based on the total mass of sulphate solution;
the washing step $a_0$) is carried out at a temperature of between 20° C. and 60° C., preferably at a temperature of between 20° C. and 40° C., and more preferably at a temperature of between 25° C. and 30° C.;
the oxidising agent and the reducing agent are added to the phosphogypsum prior to leaching step b) or to the leaching mixture during leaching step a);
the process further comprises a step d) of evaporating the leaching solution obtained in step c) in order to concentrate rare earths present in the leaching solution;
the evaporation step d) comprises at least two evaporation steps, including a first evaporation step whose evaporation rate is between 20% and 40%, preferably between 20% and 30%, and a second evaporation step whose evaporation rate is adjusted as a function of that of the first evaporation step in order to obtain an overall evaporation rate less than or equal to 51%;
the process further comprises a step e) of treating the leaching solution obtained in step c) or in step d) with ammonia in order to neutralise the leaching acid, to obtain a leaching solution with a pH greater than or equal to 1;
the process also comprises a step f) of treating the leaching solution obtained in step e) with an oxalic acid solution in order to precipitate rare earths;
the oxidising agent is selected from: sodium chlorate, potassium chlorate, sodium perchlorate and hydrogen peroxide;
the oxidising agent is added to the phosphogypsum or to the leaching mixture in a content of between 5 g/kg and 25 g/kg, preferably between 10 g/kg and 20 g/kg, based on the mass of phosphogypsum implemented in the process;
the reducing agent is added to the leaching mixture after a mixing time of between 5 minutes and 60 minutes, preferably between 15 minutes and 30 minutes;
the reducing agent is selected from: ferrous sulphate, powder iron, and metal zinc;
the reducing agent is added to the phosphogypsum or to the leaching mixture in a content of between 2 g/kg and 20 g/kg, preferably between 5 g/kg and 15 g/kg, based on the mass of phosphogypsum used in the process.

DETAILED DESCRIPTION OF THE INVENTION

The process described makes it possible to extract rare earths contained in phosphogypsum by leaching, the phosphogypsum being obtained beforehand by the action of sulphuric acid on a phosphate rock, and then to purify, that is to reduce impurities, and to concentrate the leaching solution in rare earths. As a result, the process is able to obtain rare earths from the leaching solution.

In the remainder of this text, the chemical quantities "content", expressed as a percentage or in mg/kg, and "mass concentration" expressed in mg/L, will be used as being the most appropriate with regard to the nature of the chemical substances concerned, and widely used in phosphogypsum leaching processes. A person skilled in the art will be able to switch from one chemical quantity to another according to the information available to him/her and will be able to determine the consequences of a change in one chemical quantity on another.

An optional first step $a_0$) consists in treating the phosphogypsum with a sulphate solution in order to wash the phosphogypsum. This washing makes it possible to roughly remove organic and/or mineral impurities resulting from the phosphogypsum production process. In particular, the washing makes it possible to remove mineral impurities from the phosphate rock from which the phosphogypsum was obtained and organic impurities from the sulphuric acid used to attack the phosphate rock.

Examples of suitable sulphate solutions are potassium sulphate, sodium sulphate, calcium sulphate, or a mixture thereof.

The sulphate solution preferably has a sulphate mass concentration (mass titre) of less than or equal to 25%, preferably less than or equal to 20%.

It will be preferred to mix the phosphate solution and the phosphogypsum in solid/liquid proportions of between 0.1 and 0.3.

It will be also preferred that the step of treating the phosphogypsum with the sulphate solution be carried out at a temperature of between 20° C. and 60° C., preferably between 20° C. and 40° C., and more preferably between 25° C. and 30° C.

A solid-liquid separation allows the phosphogypsum washed in the solid phase to be recovered.

Subsequently, the phosphogypsum is treated with a strong acid solution by leaching to form a leaching mixture, in the presence of an oxidising agent and/or a reducing agent.

The strong acid solution used can be especially a sulphuric acid solution, a hydrochloric acid solution, or a nitric acid solution, or a mixture of acids and especially of one or more of the acids previously mentioned.

It should be understood that phosphogypsum can be treated with a solution of a strong acid in the presence of one or more oxidising agents, or in the presence of one or more reducing agents, or in the presence of both one or more oxidising agents and one or more reducing agents.

The oxidising agent increases the solubility of the rare earths in the leaching mixture. More precisely, the phosphogypsum is initially in the form of crystals. The attack of the phosphogypsum by the strong acid degrades the structure of the phosphogypsum crystals, so that some of the rare earths initially contained in the phosphogypsum pass incidentally from the phosphogypsum into the leaching mixture, and in particular into the leaching solution in which they are soluble. The oxidising agent further improves the extraction of the rare earths from the phosphogypsum crystals to the liquid phase in the leaching solution.

The oxidising agent can be added to the phosphogypsum, optionally washed, prior to the addition of the leaching strong acid, or in the leaching mixture. Preferably, when the oxidising agent is added to the leaching mixture, it is added after a mixing time of between 5 minutes and 60 minutes, and more preferably between 15 minutes and 30 minutes.

Preferably, the oxidising agent is selected from: sodium chlorate, potassium chlorate, sodium perchlorate, and hydrogen peroxide. It is also possible to use several oxidising agents, and in particular several of the oxidising agents previously mentioned.

Preferably, the content of the oxidising agent in the leaching mixture is between 5 g/kg and 25 g/kg, and preferably between 10 g/kg and 20 g/kg based on the total weight of the leaching mixture.

The reducing agent makes it possible to reduce the solubility of the mineral impurities contained in the leaching solution. In other words, the reducing agent promotes precipitation of the mineral impurities in order to make them pass into the solid phase. Subsequent removal of the impurities by solid-liquid separation is then possible and effective.

The reducing agent can be added to the phosphogypsum, optionally washed, prior to the addition of the strong leaching acid, or in the leaching suspension subsequently to the addition of the strong acid. Preferably, when the reducing agent is added to the leaching suspension, it is added after a mixing time of the phosphogypsum and the strong acid of between 5 minutes and 60 minutes, and more preferably between 15 minutes and 30 minutes.

Preferably, the reducing agent is chosen from: ferrous sulphate, powder iron and metal zinc. It is also possible to use several reducing agents, and in particular several of the reducing agents previously mentioned.

Preferably, the mass concentration of the reducing agent in the leaching suspension is between 2 g/kg and 20 g/kg, preferably between 5 g/kg and 15 g/kg, and more preferably at a mass concentration of about 10 g/kg, based on the total weight of the leaching suspension.

The mixing temperature is preferably carried out at a temperature between 20° C. and 60° C., preferably between 20° C. and 40° C., and more preferably between 25° C. and 30° C. In particular, when the phosphogypsum is previously washed with a sulphate solution, it is possible to maintain an identical temperature for washing and mixing. In the latter case, this is referred to as the process temperature.

Once the phosphogypsum has been leached, a solid/liquid separation, by filtration for example, makes it possible to separate the solid phase containing the phosphogypsum and the impurities that have passed from the leaching solution into the solid phase, from the liquid phase formed by the leaching solution containing the rare earths and the strong leaching acid.

The leaching solution is then evaporated in order to concentrate the rare earths. Evaporation actually allows the removal of volatile chemical species from the solution, especially some volatile impurities.

Advantageously, evaporation is carried out in such a way as to obtain an evaporation rate of less than 60%, and preferably less than 51%.

According to a particular embodiment, the evaporation of the leaching solution comprises two evaporation steps. This allows more volatile impurities to be removed from the leaching solution. The evaporation thus advantageously comprises a first evaporation step, the evaporation rate of which is between 20% and 40%, preferably between 20% and 30%, and a second evaporation step, the evaporation rate of which is adjusted as a function of that of the first evaporation step in order to obtain an overall evaporation rate of less than or equal to 51%.

At the end of the evaporation step, the concentrated solution obtained is neutralised with ammonia to a pH of approximately 1. Gaseous ammonia ($NH_{3,gas}$) or an aqueous ammonia solution ($NH_{3,aqueous}$) can be used.

Finally, an oxalic acid solution is added to the leaching solution to precipitate rare earths, which are then recovered by solid/liquid separation and possibly purified by any suitable subsequent chemical purification treatment.

The process just described increases the mass concentration of rare earths in the leaching solution by virtue of the presence of the oxidising agent which solubilises the rare earths from the phosphogypsum into the leaching solution. The mass concentration of mineral impurities in the leaching solution is in turn reduced by virtue of the presence of the reducing agent decreasing solubility of the impurities and causing them to precipitate out of the leaching solution.

Therefore, the process allows a leaching solution and consequently a final rare earth product with an increased amount of rare earths and a reduced amount of inorganic impurities as compared to the processes of the state of the art to be obtained, while keeping a good reaction yield.

This aspect is illustrated by the following example, which describes two operating protocols for treating phosphogypsum according to the process previously described.

EXAMPLE

Extraction of Rare Earths from Phosphogypsum

An extraction of rare earths from phosphogypsum is performed according to protocols 1 and 2 set forth below:

Protocol 1

In 800 mL of sulphuric acid of normality equal to 2, 200 g of phosphogypsum are mixed, then sodium chlorate is added at a content of 15 g/kg based on the weight of the leaching mixture. Before being mixed with sulphuric acid, the phosphogypsum is washed with a sulphate solution with a sulphate concentration of 20% by weight.

After 20 minutes of stirring, powder iron is introduced into the leaching mixture at a content of 10 g/kg based on the weight of the leaching mixture, and mixing of the leaching suspension is continued for about 4 hours. The solid and liquid phases are then separated, and the leaching solution is evaporated.

For protocol 1, four tests are carried out, referenced (1), (2), (3) and (4) in Table I below, with the operating conditions and amounts of impurities and rare earths obtained.

TABLE I

| | Operating conditions | | | | Amount | | | | | |
|---|---|---|---|---|---|---|---|---|---|---|
| Test | Washing | T (° C.) | Oxydiser | Reducer | Rare earths BE (mg/kg) | Rare earths AF (mg/kg) | P2O5 (%) | CaO (mg/L) | Rare earths in solution BE (mg/L) | Rare earths in solution AF (mg/L) |
| 1 | Yes | 25 | NaClO3 | Powder iron | 378 | 401 | 1.2 | 1.3 | 58.32 | 97.20 |
| 2 | Yes | 60 | NaClO3 | Powder iron | 378 | 401 | 1.5 | 2.4 | 53.81 | 89.70 |
| 3 | No | 25 | No | No | 367 | — | 7 | 19 | 27.4 | 45.67 |
| 4 | No | 60 | No | No | 367 | — | 9 | 26 | 19 | 31.67 |

Protocol 2

400 g of phosphogypsum is washed with potassium sulphate solution and potassium chlorate is added at a concentration of 10 g/kg. Then 600 mL of nitric acid with a normality of 2 is added at room temperature. The leaching mixture is stirred for 15 minutes, and then zinc powder is added at a content of 5 g/kg. Mixing is continued for about 6 hours. The solid and liquid phases are then separated, and the leaching solution is evaporated.

In a similar way to protocol 1, four tests are carried out and referenced (1), (2), (3) and (4) in Table II below with the operating conditions and amounts of impurities and of rare earths obtained.

TABLE II

| | Operating conditions | | | | Amounts | | | | | |
|---|---|---|---|---|---|---|---|---|---|---|
| Test | Washing | T (° C.) | Oxydiser | Reducer | Rare earths BE (mg/kg) | Rare earths AF (mg/kg) | P2O5 (%) | CaO (mg/L) | Rare earths in solution BE (mg/L) | Rare earths in solution AF (mg/L) |
| 1 | Yes | 25 | KClO3 | Zinc powder | 398 | 442 | 3.61 | 7.32 | 176 | 246.4 |
| 2 | Yes | 60 | KClO3 | Zinc powder | 398 | 421 | 4.93 | 8.6 | 179 | 260 |
| 3 | No | 25 | Non | No | 398 | — | 9.42 | 28.32 | 108 | 151.2 |
| 4 | No | 60 | Non | No | 398 | — | 12.1 | 31 | 113 | 158.2 |

In Tables I and II, the amounts indicated in the columns represent, from left to right respectively T (° C.): the process temperature, equal to 25° C. or 60° C., and kept constant during the washing and mixing steps.

Rare Earths BE (mg/kg): the content by weight of Rare Earths in the initial phosphogypsum before washing with the sulphate solution, in mg/kg.

Rare Earths AF (mg/kg): the content by weight of Rare Earths in the initial phosphogypsum after washing with the sulphate solution, in mg/kg.

$P_2O_5$ (%): the content by weight of residual phosphorus pentoxide $P_2O_5$, from the reaction of obtaining phosphoric acid (mineral impurity), in the leaching solution after evaporation, in % by mass.

CaO (mg/L): the mass concentration of residual calcium oxide CaO, from the reaction of obtaining phosphoric acid (mineral impurity), in the leaching solution after evaporation, in mg/L.

Rare Earths in solution BE (mg/L): the mass concentration of Rare Earths in the leaching solution before evaporation, in mg/L.

Rare Earths in solution AF (mg/L): the mass concentration of Rare Earths in the leaching solution after evaporation, in mg/L.

Influence of the Washing Step

Comparing tests 1 and 2, on the one hand, with tests 3 and 4, on the other hand, for both protocols, it is noticed that pre-washing the phosphogypsum with a sulphate solution increases the rare earth content in the initial phosphogypsum, before adding the leaching acid.

For Protocol 1:

The rare earth content in the phosphogypsum increases from 378 mg/kg before washing to 401 mg/kg after washing for tests 1 and 2, while it of course remains equal to 367 mg/kg for tests 3 and 4 without washing.

For protocol 2:

The rare earth content in the phosphogypsum increases from 398 mg/kg before washing to 442 mg/kg after washing for test 1 and to 421 mg/kg for test 2, while it remains of course equal to 398 mg/kg for tests 3 and 4 without washing.

This results from the removal of impurities soluble in the phosphate solution initially present in phosphogypsum. Therefore, part of the impurities present in the phosphogypsum are removed even before it is mixed with the leaching acid.

Influence of the Process Temperature

According to a first observation, it is noticed that the weight content of rare earths in the phosphogypsum after washing depends on the process temperature.

For protocol 1:

Whether the process temperature during washing is 25° C. in test 1 or 60° C. in test 2, the rare earth content in the phosphogypsum after washing is equal to 401 mg/kg.

Thus, a cold wash at 25° C. or a hot wash at 60° C. enables the rare earth content to be increased and the impurity content to be decreased with equal efficiency.

This is because impurities in the phosphogypsum are soluble in the sulphate solution both while hot and cold.

For protocol 2:

For a mixing temperature of 25° C. in test 1, the rare earth content in the phosphogypsum after washing is equal to 442 mg/kg as compared to only 421 mg/kg for a temperature of 60° C. in test 2.

Washing at 25° C. is more effective here. This is due to the fact that impurities present in the phosphogypsum are mostly soluble in the sulphate solution while cold, and only a minority are soluble while hot.

According to a second observation, it is noticed that the content by weight of phosphorus pentoxide $P_2O_5$ and the mass concentration of calcium oxide CaO are lower at a process temperature of 25° C. than at a process temperature of 60° C.

For protocol 1:

The tests with washing (tests 1 and 2) and then the tests without washing (tests 3 and 4) are as compared.

For a process temperature of 25° C. in test 1, the $P_2O_5$ content by weight and the calcium oxide CaO mass concentration are equal to 1.2% and 1.3 mg/L respectively, as compared to 1.5% and 2.4 mg/L respectively for a temperature of 60° C. in test 2.

Similarly, for a mixing temperature of 25° C. in test 3, the $P_2O_5$ content by weight and the calcium oxide CaO concentration by weight are equal to 7% and 19 mg/L respectively, as compared to 9% and 26 mg/L respectively for a temperature of 60° C. in test 4.

For protocol 2:

The tests with washing (tests 1 and 2) and then the tests without washing (tests 3 and 4) are compared with each other.

For a process temperature of 25° C. in test 1, the $P_2O_5$ content by weight and the calcium oxide CaO mass concentration are equal to 3.61% and 7.32 mg/L respectively, as compared to 4.93% and 8.6 mg/L for a temperature of 60° C. in test 2.

Similarly, for a mixing temperature of 25° C. in test 3 the $P_2O_5$ content by weight and the calcium oxide CaO concentration by weight are equal to 9.42% and 28.32 mg/L respectively, as compared to 12.1% and 31 mg/L respectively for a temperature of 60° C. in test 4.

Therefore, a process temperature of 25° C. enables the content of $P_2O_5$ and CaO in the leaching solution to be reduced more significantly than a process temperature of 60° C.

Influence of Oxidising and Reducing Agents

According to a first observation, it is noticed that, regardless of the process temperature, the presence of an oxidising agent in the leach suspension results in an increase in the mass concentration of rare earths in the leaching solution.

For Protocol 1:

The tests at 25° C. (tests 1 and 3) and then the tests at 60° C. (tests 2 and 4) are compared with each other.

For a mixing temperature of 25° C., the mass concentrations of rare earths in solution before and after evaporation are 58.32 mg/L and 97.20 mg/L respectively in test 1, as compared with only 27.4 mg/L and 45.67 mg/L in test 3.

Similarly, for a mixing temperature of 60° C., the rare earth mass concentrations in solution before and after evaporation are 53.81 mg/L and 89.70 mg/L respectively in test 2 as compared to only 19 mg/L and 31.67 mg/L in test 4.

For protocol 2:

The tests at 25° C. (tests 1 and 3) and then the tests at 60° C. (tests 2 and 4) are compared with each other.

For a process temperature of 25° C., the mass concentrations of rare earths in solution before and after evaporation are 176 mg/L and 246.4 mg/L respectively in test 1, as compared to only 108 mg/L and 151.2 mg/L in test 3.

Similarly, for a mixing temperature of 60° C., the rare earth mass concentrations in solution before and after evaporation are 179 mg/L and 260 mg/L respectively in test 2 as compared to only 113 mg/L and 158.2 mg/L in test 4.

The increase in the mass concentration of rare earths in the leaching solution is due to the presence of the oxidising agent which increases solubilisation of rare earths in the leaching solution.

It is also noticed that, regardless of the process temperature, the presence of a reducing agent in the leach suspension results in a decrease in the content of impurities in the leaching solution obtained.

For Protocol 1:

The tests at 25° C. (tests 1 and 3) and then the tests at 60° C. (tests 2 and 4) are compared with each other.

For a process temperature of 25° C., the $P_2O_5$ content and the CaO mass concentration are respectively 1.2% CaO and 1.3 mg/L in test 1, as compared to 7% and 19 mg/L in test 3.

Similarly, for a mixing temperature of 60° C., the $P_2O_5$ content and CaO mass concentration are 1.5% and 2.4 mg/L respectively in test 2 as compared to 9% and 26 mg/L in test 4.

For protocol 2:

The tests at 25° C. (tests 1 and 3) and then the tests at 60° C. (tests 2 and 4) are compared with each other.

For a process temperature of 25° C., the $P_2O_5$ content and CaO mass concentration are 3.61% and 7.32 mg/L respectively in test 1 as compared to 9.42% and 28.32 mg/L in test 3.

Similarly, for a mixing temperature of 60° C., the $P_2O_5$ content and the CaO mass concentration are 4.93% and 8.6 mg/L respectively in test 2, as compared to 12.1% and 31 mg/L in test 4.

The decrease in $P_2O_5$ content and CaO mass concentration in the leaching solution is due to the presence of the reducing agent which decreases solubilisation of $P_2O_5$ and CaO in the leaching solution.

Therefore, the simultaneous presence of an oxidising agent and a reducing agent makes it possible to obtain jointly very low mass concentrations of impurities and very high contents of rare earths in the leaching solution obtained.

Influence of the Evaporation Step of the Leaching Solution

It is noticed that, regardless of the process temperature, in the presence or absence of a pre-wash, evaporation of the leaching solution increases the mass concentration of rare earths in the leaching solution.

For protocol 1:

For tests 1, 2, 3, and 4, the mass concentration of rare earths in the leaching solution increases from pre-evaporation to post-evaporation from 58.32 mg/L to 97.20 mg/L for test 1, from 53.81 mg/L to 89.70 mg/L for test 2, from 27.4 mg/L to 45.67 mg/L for test 3, and from 19 mg/L to 31.67 mg/L for test 4.

For Protocol 2:

For tests 1, 2, 3, and 4, the mass concentration of rare earths in the leaching solution increases from pre-evaporation to post-evaporation from 176 mg/L to 246.4 mg/L for test 1, from 179 mg/L to 260 mg/L for test 2, from 108 mg/L to 151.2 mg/L for test 3, and from 113 mg/L to 158.2 mg/L for test 4.

The evaporation step thus enables the leaching solution to be concentrated in rare earths, and the remaining volatile chemical species after leaching, and in particular the volatile impurities, to be removed from the leaching solution.

REFERENCES

CN104903476
WO2011/008137
WO2013060689

The invention claimed is:

1. Process for purifying and concentrating rare earths contained in phosphogypsum comprising providing a phosphogypsum and further comprising the steps of:
   a) leaching the phosphogypsum with a solution of one or more strong acid(s) selected from the group consisting of sulphuric acid, nitric acid and hydrochloric acid, in order to obtain a leaching mixture comprising a liquid phase formed by a leaching solution containing rare earths originating from the phosphogypsum and the leaching acid, and a solid phase comprising the phosphogypsum,
   b) adding, to the phosphogypsum, an oxidising agent selected from the group consisting of sodium chlorate and potassium chlorate to promote passage of the rare earths from the phosphogypsum into the leaching solution, and a reducing agent selected from the group consisting of powder iron and metal zinc to reduce solubility of mineral impurities contained in the leaching solution in order to allow their passage from the leaching solution into the solid phase,
   c) separating the liquid phase enriched in rare earths and depleted in mineral impurities, and the solid phase enriched in mineral impurities.

2. The process according to claim 1, further comprising a step $a_0$) of washing the phosphogypsum with a sulphate solution which is carried out prior to leaching step a).

3. The process according to claim 2, wherein the sulphate solution implemented in step ao) is a potassium sulphate solution, a sodium sulphate solution, a calcium sulphate solution, or a mixture thereof.

4. The process according to claim 3, wherein the sulphate content in the sulphate solution is less than or equal to 25%, preferably less than or equal to 20%, based on the total mass of sulphate solution.

5. The process according to claim 2, wherein the sulphate content in the sulphate solution is less than or equal to 25% based on the total mass of sulphate solution.

6. The process according to claim 2 wherein the washing step $a_0$) is carried out at a temperature of between 20° C. and 60° C.

7. The process according to claim 1 wherein the oxidizing agent and the reducing agent are added to the phosphogypsum prior to leaching step b), or to the leaching mixture during leaching step a).

8. The process according to claim 1 further comprising a step d) of evaporating a leaching solution obtained in step c) in order to concentrate the rare earths present in the leaching solution.

9. The process according to claim 8, wherein the evaporation step d) comprises at least two evaporation steps, including a first evaporation step whose evaporation rate is between 20% and 40%, and a second evaporation step whose evaporation rate is adjusted as a function of that of the first evaporation step in order to obtain an overall evaporation rate less than or equal to 51%.

10. The process according to claim 1 further comprising a step e) of treating a leaching solution obtained in step c) with ammonia in order to neutralise the leaching acid, in order to obtain a leaching solution whose pH is greater than or equal to 1.

11. The process according to claim 10 further comprising a step f) of treating the leaching solution obtained in step e) with an oxalic acid solution in order to precipitate the rare earths.

12. The process according to claim 1 wherein the oxidising agent is added to the phosphogypsum or to the leaching mixture in a content of between 5 g/kg and 25 g/kg, based on the mass of phosphogypsum implemented in the process.

13. The process according to claim 1 wherein the reducing agent is added to the leaching mixture after a mixing time of between 5 minutes and 60 minutes.

14. The process according to claim 1 wherein the reducing agent is added to the phosphogypsum or to the leaching mixture in a content of between 2 g/kg and 20 g/kg based on the mass of phosphogypsum used in the process.

15. The process according to claim 1 further comprising a step d) of evaporating a leaching solution obtained in step c) in order to concentrate the rare earths present in the leaching solution and further comprising a step e) of treating the leaching solution obtained in step d) with ammonia in order to neutralise the leaching acid, in order to obtain a leaching solution whose pH is greater than or equal to 1.

* * * * *